(12) United States Patent
Top et al.

(10) Patent No.: US 11,626,703 B2
(45) Date of Patent: Apr. 11, 2023

(54) CABLE STRIPPING DEVICE

(71) Applicant: SILEC CABLE, Montereau-Fault-Yonne (FR)

(72) Inventors: Abdou-Karim Top, Écuelles (FR); Didier Lagneau, La Grande Paroisse (FR); Christophe Casuc, Montereau-Fault-Yonne (FR)

(73) Assignee: SILEC CABLE, Montereau-Fault-Yonne (FR)

( * ) Notice: Subject to any disclaimer, the term of this patent is extended or adjusted under 35 U.S.C. 154(b) by 141 days.

(21) Appl. No.: 16/956,522

(22) PCT Filed: Dec. 20, 2018

(86) PCT No.: PCT/EP2018/086386
§ 371 (c)(1),
(2) Date: Jun. 19, 2020

(87) PCT Pub. No.: WO2019/122235
PCT Pub. Date: Jun. 27, 2019

(65) Prior Publication Data
US 2022/0140560 A1     May 5, 2022

(30) Foreign Application Priority Data

Dec. 20, 2017 (FR) .................................. 17 62675

(51) Int. Cl.
*C12C 3/00* (2006.01)
*H01R 43/28* (2006.01)
*H02G 1/12* (2006.01)

(52) U.S. Cl.
CPC .......... *H01R 43/28* (2013.01); *H02G 1/1214* (2013.01)

(58) Field of Classification Search
CPC ...... A47J 31/36; A47J 31/407; A47J 31/3633; A47J 31/3638
See application file for complete search history.

(56) References Cited

U.S. PATENT DOCUMENTS

| 3,222,957 A | 12/1965 | Kramer et al. | |
| 5,755,149 A * | 5/1998 | Blanc .................. | A47J 31/3633 99/295 |
| 2006/0130665 A1 * | 6/2006 | Jarisch ................ | A47J 31/3638 99/279 |

(Continued)

FOREIGN PATENT DOCUMENTS

| CN | 2271052 Y | 12/1997 |
| CN | 203086066 U | 7/2013 |
| GB | 1187927 A | 4/1970 |

(Continued)

OTHER PUBLICATIONS

International Search Report, dated Feb. 28, 2019, for International Application No. PCT/EP2018/086386, 2 pages.

*Primary Examiner* — Phuong Chi Thi Nguyen
(74) *Attorney, Agent, or Firm* — Seed IP Law Group LLP

(57) ABSTRACT

A device for stripping a cable is provided. The device includes an extraction chamber and a pusher mounted with an ability to move in the extraction chamber between a rest position and a deployed position. A distal end of the extraction chamber is closed by a flange including a slot. The pusher pushes on the cable in order to press the cable against the slot in the flange.

10 Claims, 2 Drawing Sheets

(56) References Cited

U.S. PATENT DOCUMENTS

2021/0288416 A1\* 9/2021 Witte .................. H01R 4/4836
2021/0313713 A1\* 10/2021 Witte .................. H01R 4/4836

FOREIGN PATENT DOCUMENTS

| JP | 56-31310 A | 3/1981 |
|---|---|---|
| JP | H099445 A | 1/1997 |
| JP | 2001-268740 A | 9/2001 |
| WO | 2011/136001 A1 | 11/2011 |

\* cited by examiner

CABLE STRIPPING DEVICE

The invention relates to a device for stripping a cable.

BACKGROUND OF THE INVENTION

In the field of high-voltage electrical power transporting cables or medium-voltage power transporting cables, it is commonplace for the cables to be delivered to site unfinished, which means to say without cable accessories.

It is therefore on site that the operators prepare the two ends of each cable, either in order to join two cables together or in order to add by way of accessory a cable termination such as a silicone sleeve termination.

In order to do that, the operators have to use a tool to strip the ends of the cables so as to remove the layers surrounding the central electrical conductor (which is sometimes stranded) in order to prepare it for joining to another cable and/or a cable termination accessory. This then proves to be a relatively painstaking task especially since the tool with which the operators strip the cables is fitted with somewhat unsuitable cutters.

Such a hand tool thus comprises a plate provided with an orifice through which the end of a cable is provisioned, cutters extending through the orifice so that, by twisting the plate, the cutters progressively tear away the layers surrounding the central electric conductor. The operator can thus strip the cable, bit by bit.

This solution remains relatively painstaking. Thus it takes approximately two hours for an operator to strip two cable ends in order to prepare them for joining. Furthermore, the tool may also be dangerous for the operators to handle.

OBJECT OF THE INVENTION

One objective of the invention is to propose a device for stripping a cable more easily.

BRIEF DESCRIPTION OF THE INVENTION

In order to achieve this objective, there is proposed a device for stripping a cable, the device comprising at least:
- an extraction chamber a distal end of which is closed by a flange comprising a slot,
- a pusher mounted with the ability to move in the extraction chamber between a rest position in which the pusher extends level with a proximal end of the chamber, and a deployed position, the pusher being intended to push on the cable in order to press it against the slot in the flange.

In service, an operator makes a cut in the cable then positions the device in such a way that the slot in the flange accepts the cable at this cut: all the operator then needs to do is move the pusher between its rest position and its deployed position to press the cable against the slot thereby causing the concentric outer layer or layers of the cable that are to be removed to become detached, as the slot has a cross section smaller than that of the cable.

The invention thus proves to be simple and quick to use, and also safe for the operator.

Furthermore, the invention allows an entire length of one or more layers of cable to be removed in one piece rather than in the multitude of bits using the devices of the prior art.

As a preference, although not exclusively, the invention is suitable for stripping an end of a cable to prepare it for joining to another cable and/or for associating it with a cable accessory such as a cable termination.

The inventor has thus been able to develop a prototype that allows two cable ends to be prepared for joining in just fifteen minutes or so.

Optionally, the flange is mounted removably in the extraction chamber.

Optionally, the device comprises a cap arranged on a free end of the pusher so that in service, the pusher pushes on the cable via the cap.

Optionally, the cap is mounted removably on the pusher.

Optionally, the cap is attached to the pusher using magnetism.

Optionally, the pusher is mounted with the ability to slide in the extraction chamber between its rest position and its deployed position.

Optionally, the device comprises means for automatically actuating the pusher.

Optionally, the automatic-actuation means are hydraulic actuation means.

Optionally, the extraction chamber is open and has no cover.

Optionally, the device comprises at least one handle to make the extraction chamber easier to handle.

Further features and advantages of the invention will become apparent from reading the following description of one particular nonlimiting embodiment of the invention.

BRIEF DESCRIPTION OF THE DRAWINGS

The invention will be better understood in the light of the following description with reference to the attached figures among which.

DETAILED DESCRIPTION OF THE INVENTION

Figure 1:
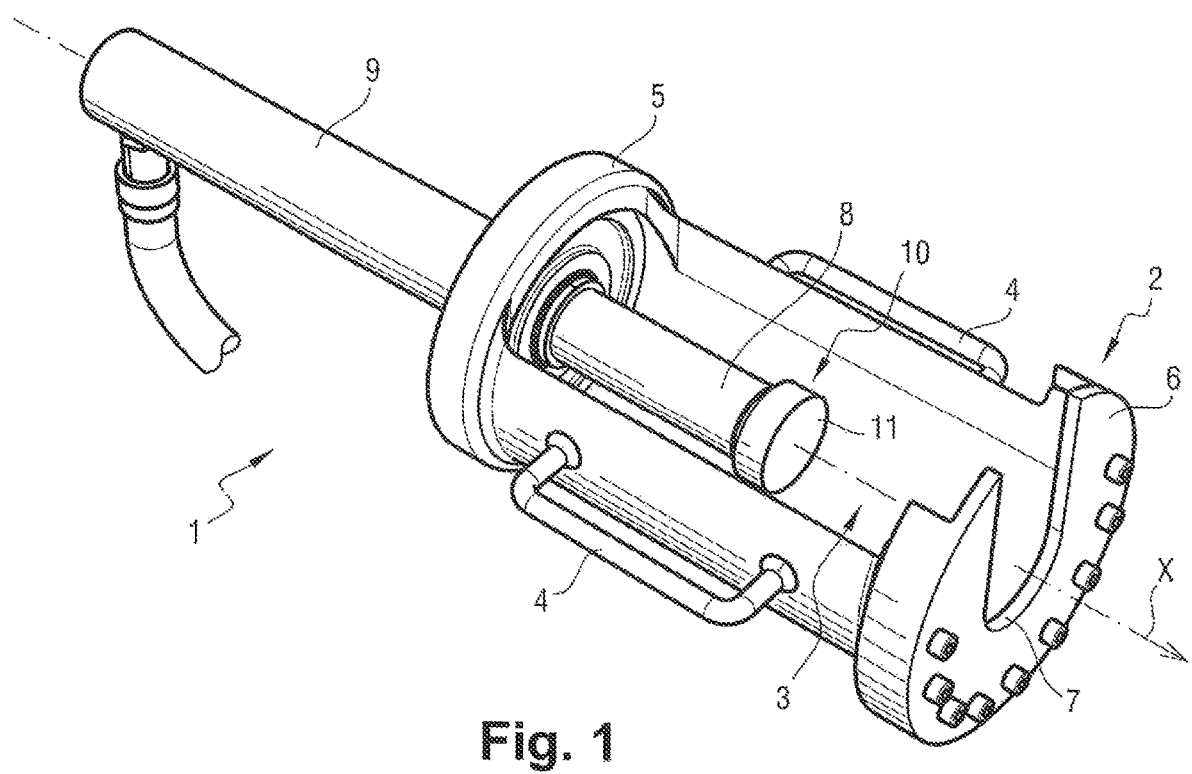
FIG. 1 is a perspective view of the device according to one particular embodiment of the invention, FIGS. 2a, 2b and 2c illustrative various successive steps in stripping a cable using a device as illustrated in FIG. 1.

With reference to FIG. 1, the device according to one particular embodiment of the invention, denoted overall as 1, comprises an extraction chamber 2 extending longitudinally along a first axis X.

The extraction chamber 2 comprises a central body 3.

The central body 3 is generally configured as a right cylinder, with its directrix straight line coinciding with the first axis X. According to one particular embodiment, the central body 3 is also open over its entire length (considered along the first axis X) but over just an angular sector of its cylindrical surface. Typically, said angular sector is comprised between 90 and 200 degrees. As a preference, the angular sector represents substantially 180 degrees so that the cylindrical surface of the central body 3 is configured as a half-cylinder.

The extraction chamber 2 here has no cover for removably closing said central body 3.

As a preference, the device 1 comprises at least one handle to make the extraction chamber 2 easier for an operator to handle. In particular, the device 1 comprises two handles 4 for the handling of the extraction chamber 2. Typically, the two handles 4 are arranged on the central body so that they are radially opposite one another.

The extraction chamber 2 comprises a proximal flange 5 which is arranged at a proximal end of the central body 3 so as to form the proximal end of the extraction chamber 2. Said proximal flange 5 here has a substantially circular cross section (in section normal to the first axis X). Said proximal flange 5 is also arranged in such a way as to be concentric with the central body 3 and in this instance with the first axis X.

Moreover, the extraction chamber 2 comprises a distal flange 6 which is arranged at a distal end of the central body 3 so as to form the distal end of the extraction chamber 2. Said distal flange 6 here has a substantially circular cross section (a section normal to the first axis X). Said distal flange 6 is furthermore arranged in such a way as to be concentric with the central body 3 and in this instance with the first axis X.

A slot 7 is furthermore made in the distal flange 6. Said slot 7 is, for example, U-shaped.

The slot 7 extends radially from one edge of the distal flange 6 toward the center of said distal flange 6. For example, the slot 7 extends as far as the center of said distal flange 6. The slot 7 here extends in such a way as to open onto the edge of said distal flange 6 in the open portion of the central body 3.

The slot 7 has a width substantially equal to the diameter of the portion of cable that is to be kept.

As a preference, the distal flange 6 is arranged removably on the central body 3 so that it is easy to replace said distal flange 6 with another in which a slot with different dimensions is formed.

Thus, using the one same device, it becomes possible to strip cables of different dimensions and/or to strip the one same cable down to different thicknesses according to the distal flange used.

The distal flange 6 is for example screwed onto the main body 3.

That allows for easy changing of distal flange that can be performed directly on site.

Furthermore, the device 1 comprises a pusher in this instance configured in the form of a rectilinear rod 8. Said rod 8 is preferably mounted with the ability to slide in the extraction chamber 2 between a rest position and a deployed position. The axis of sliding of the rod 8 is for example coincident with the first axis X.

The rod 8 is arranged in such a way that, in the rest position, the rod 8 extends in the extraction chamber 2 level with the proximal flange 5 and so that in the deployed position, the rod 8 extends into the extraction chamber 2 to the level of the distal flange 6. However, the rod 8 may stop in any position intermediate between the rest position and the deployed position.

The rod 8 forms, for example, part of an actuating cylinder of which the body 9 is secured to the extraction chamber 2 being, for example, arranged in the outside of the extraction chamber 2 at the level of the proximal flange 5, the rod 8 then passing through the proximal flange 5 so as to be able to slide in the extraction chamber 2. The body of actuating cylinder 9 thus extends in the extension of the extraction chamber 2 along the first axis X.

As a preference, the device 1 comprises means for actuating the actuating cylinder 9, and therefore the rod 8, which means are automatic (and not visible here). The automatic actuation means are preferably hydraulic actuation means.

As a preference, the device 1 comprises a cap 10 which is arranged on one end of the rod 8 in order to conceal said end. The cap 10 comprises a planar bearing face 11 via which the rod 8 pushes on the cable that is to be stripped.

In that way, the pressures exerted by the rod 8 on the center of the cable are far better distributed. This also avoids the rod 8 pushing directly on the center of the cable that needs ultimately to be used.

The cap 10 is for example configured overall as a right cylinder.

The surface area of the bearing face 11 of the cap 10 is less than or equal to the magnitude to that of the cross section of the portion of cable that is to be kept and against which said bearing face 11 pushes in service.

As a preference, the surface area of the bearing face 11 of the cap 10 is equal to the area of the cross section of the portion of cable that is to be kept and against which said bearing face 11 pushes in service.

The rod 8 is moreover dimensioned so that it does not impede the tearing-away of the external layers of the portion of cable that is to be kept.

The cap 10 is arranged removably on the rod 8 so that it is easy to replace said cap 10 with another of different dimensions.

Thus it is possible with the one same device to use a cap 10 with cables of different dimensions and/or with the same cable stripped down to different thicknesses.

The cap 10 is attached to the rod 8 using magnetism or screwing for example.

This allows for an easy change of cap 10 which can be performed directly on site. Furthermore, it allows the cap 10 to press firmly against a central electrical conductor if such a conductor is present in the cable.

One implementation of such a device will now be described.

Figure 2A:
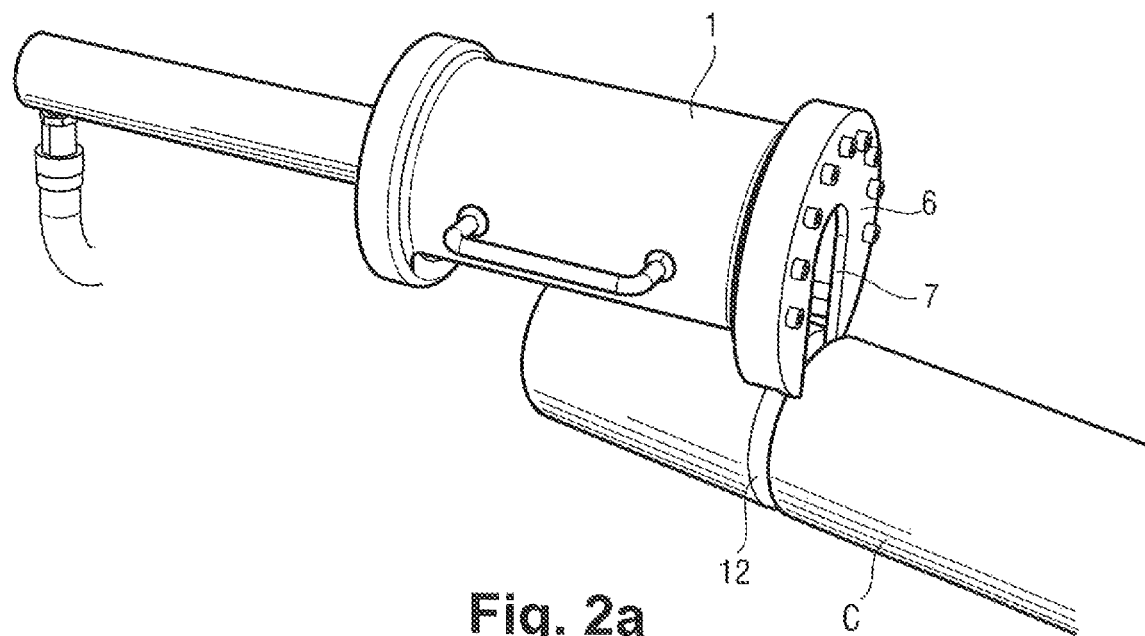

As visible in FIG. 2a, the operator first of all makes a cut 12 in the end of the cable C down to the desired depth (according to the depth to which he wishes to strip the cable C) and at the desired length (according to the length of the end of cable C that he wishes to strip).

This step is well known to those skilled in the art and will not be detailed here.

The operator then arranges the device 1 in such a way that the slot 7 in the distal flange 6 is positioned in the cut 12, the end of the cable C then being housed in the extraction chamber 2. The slot 7 is thus a slot that accepts a cut 12 in the cable C, namely a slot that can accept the stripped cable C'.

Figure 2B:
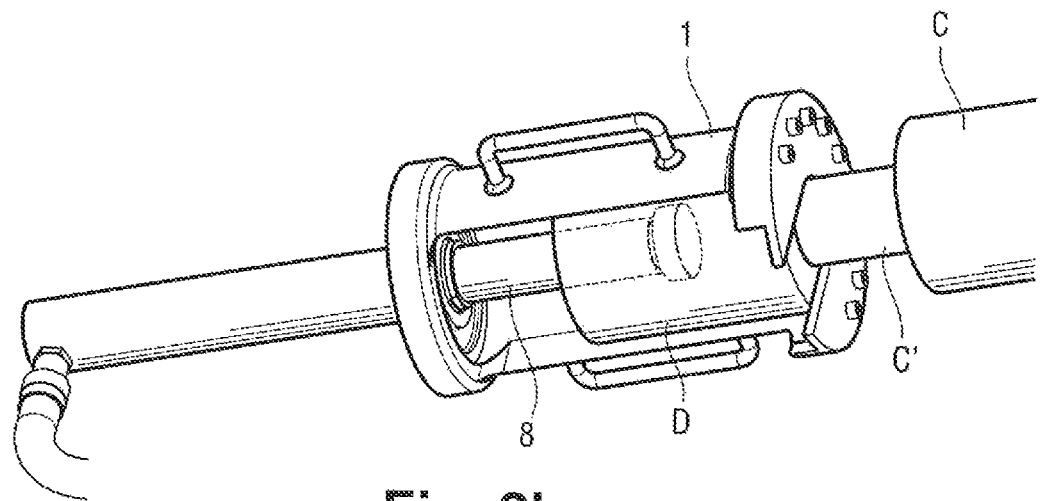

With reference to FIG. 2b, the operator activates the actuating means which cause the rod 8 to move from its rest position toward its deployed position.

The rod 8 advances and ends up touching, via the cap 10, the portion of cable that is to be kept C'. The rod 8 continues to advance, pushing the end of cable C out of the extraction chamber 2, thereby causing the external layers around the portion of cable that is to be kept C' to be torn away and the end of the cable passes past the slot.

Figure 2C:
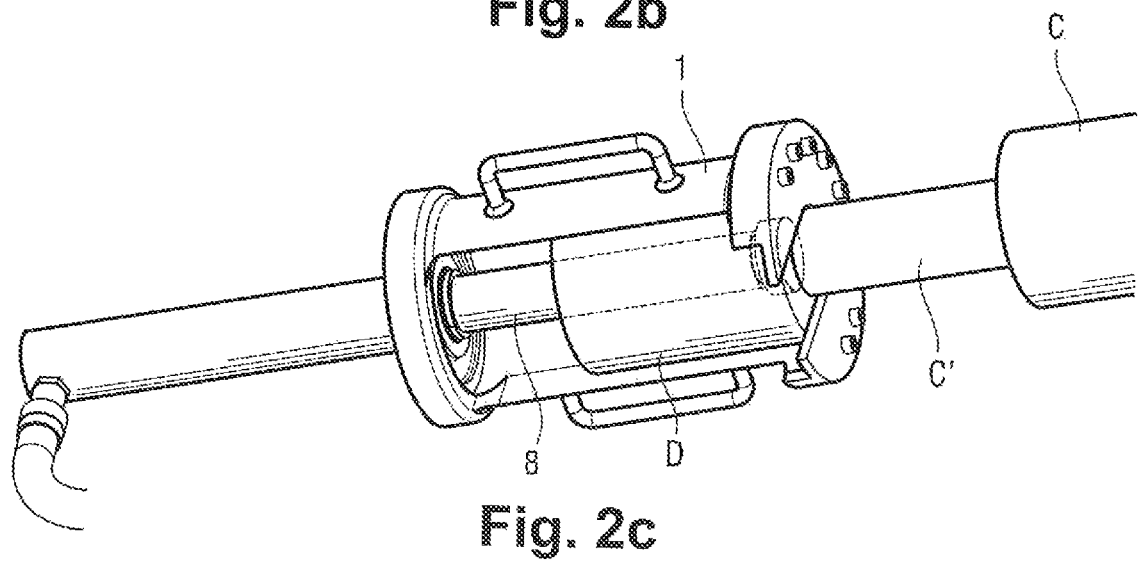

As can be seen in FIG. 2c, the rod 8 continues to advance until the entire end of the cable C has left the extraction chamber (the rod 8 then being in its deployed position or in an intermediate position depending on the length over which the desire has been to strip the end of the cable C).

The operator can then deactivate the actuating means.

From the extraction chamber he can thus recover an entire hollow length D of removed layer(s).

The device 1 therefore allows the waste associated with the preparation of the cable C to be recovered in a compact form and even in one single piece.

The cable C is thus stripped in a simple and effective way.

Advantageously, the operator does not need to rest the device 1 on a support and can entirely carry the device 1 around by its handles 4 while using the device 1.

Therefore the device 1 described can be used to, for example although not exclusively, strip a high-voltage (namely a voltage higher than 50 kilovolts) electrical power transporting cable or a medium-voltage (namely a voltage lower than 50 kilovolts and higher than 1 kilovolt) power transporting cable. Optionally, the device 1 described is used to strip an electrical power transporting cable in such a way as to keep only be central electrical conductor (which is sometimes stranded).

The device 1 is, however, suited to stripping a cable either fully, so as to reach a central layer of said cable, or partially, so as to strip down to one of the intermediate layers of the cable surrounding the central layer.

Of course, the invention is not restricted to the embodiment described and variations can be made thereto without departing from the scope of the invention as defined by the claims.

The central body may be closed by a removable cover.

The means for actuating the pusher may be pneumatic rather than hydraulic.

The movement of the pusher may be brought about manually or automatically.

The pusher may be mounted with the ability to move with respect to the extraction chamber other than in the way indicated. For example, the pusher may be moved in a helicoidal movement between its rest position and its deployed position.

The pusher may thus adopt a form other than that illustrated and comprise, for example, a spiral portion.

The pusher may push directly on the cable without an intermediate cap.

The device may be equipped with a cutting tool, which may or may not be automated, so that it itself makes the cut into which the slot in the distal flange is inserted.

The slot may have a shape other than that described and may be, for example, V-shaped or else may have ends that extend toward one another.

Although in this instance, the slot has smooth contours, said slot could have cutting contours, for example via a flat blade and/or a serrated blade so as to make it easier to tear away the layer(s) of the cable. The slot could also be considered in such a way that part of its contours was smooth and another part cutting.

The invention claimed is:

1. A device for stripping a cable, the device comprising at least:
    an extraction chamber, a distal end of which is closed by a flange including a slot; and
    a pusher mounted with an ability to move in the extraction chamber between a rest position, in which the pusher extends level with a proximal end of the extraction chamber, and a deployed position, in which the pusher is configured to push on the cable in order to press the cable against the slot in the flange.

2. The device as claimed in claim 1, wherein the flange is mounted removably in the extraction chamber.

3. The device as claimed in claim 1, wherein the pusher is mounted with an ability to slide in the extraction chamber between the rest position and the deployed position.

4. The device as claimed in claim 1, wherein the extraction chamber is open and has no cover.

5. The device as claimed in claim 1, comprising at least one handle coupled to the extraction chamber.

6. The device as claimed in claim 1, comprising an automatic actuation means for automatically actuating the pusher.

7. The device as claimed in claim 6, wherein the automatic-actuation means is a hydraulic actuation means.

8. The device as claimed in claim 1, comprising a cap arranged on a free end of the pusher so that in operation, the pusher pushes on the cable via the cap.

9. The device as claimed in claim 8, wherein the cap is mounted removably on the pusher.

10. The device as claimed in claim 9, wherein the cap is attached to the pusher using magnetism.

\* \* \* \* \*